(12) United States Patent
Jyrinki

(10) Patent No.: US 8,359,538 B2
(45) Date of Patent: Jan. 22, 2013

(54) METHOD FOR SHARING CALENDAR CONTENT IN COMMUNICATIONS SYSTEM, COMMUNICATIONS SYSTEM AND TERMINAL

(75) Inventor: Kimmo Jyrinki, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/583,789

(22) PCT Filed: Dec. 21, 2004

(86) PCT No.: PCT/FI2004/000785
§ 371 (c)(1),
(2), (4) Date: Jun. 21, 2006

(87) PCT Pub. No.: WO2005/062279
PCT Pub. Date: Jul. 7, 2005

(65) Prior Publication Data
US 2007/0186151 A1    Aug. 9, 2007

(30) Foreign Application Priority Data
Dec. 22, 2003  (FI) .................................... 20031887

(51) Int. Cl.
*G06F 3/00* (2006.01)
(52) U.S. Cl. ......... 715/733; 715/739; 715/750; 715/745
(58) Field of Classification Search .................. 715/733, 715/963, 745, 750, 739
See application file for complete search history.

(56) References Cited

U.S. PATENT DOCUMENTS

| | | | | |
|---|---|---|---|---|
| 4,807,155 A | * | 2/1989 | Cree et al. ...................... | 715/733 |
| 4,831,552 A | | 5/1989 | Scully et al. .................. | 364/518 |
| 5,864,848 A | * | 1/1999 | Horvitz et al. .................... | 1/1 |
| 6,018,343 A | * | 1/2000 | Wang et al. .................... | 715/733 |
| 6,111,572 A | * | 8/2000 | Blair et al. .................... | 715/703 |
| 6,141,005 A | * | 10/2000 | Hetherington et al. ....... | 715/866 |

(Continued)

FOREIGN PATENT DOCUMENTS

| | | |
|---|---|---|
| EP | 1209932 | 5/2002 |
| FI | 112998 | 2/2004 |

(Continued)

OTHER PUBLICATIONS

Office Action from corresponding application CN 200480038385.5 dated Sep. 4, 2009, 21 pages.

(Continued)

*Primary Examiner* — Omar Abdul-Ali
*Assistant Examiner* — Sherrod Keaton
(74) *Attorney, Agent, or Firm* — Harrington & Smith

(57) ABSTRACT

The invention describes a method for sharing calendar content in a communications system, a communications system, and a terminal. The communications system comprises a terminal and at least one remote device, and the terminal is configured to generate calendar content from one or more calendar notes. The communications system is configured to associate calendar notes with calendar profiles of the terminal, which define a unique view to the calendar content on the basis of the calendar notes associated with the calendar profile; to select in the terminal at least one calendar profile for generating calendar content to be shared; to generate the calendar content to be shared on the basis of at least one selected calendar profile and the calendar notes associated with it; and to share the generated calendar content between the terminal and the remote device.

12 Claims, 2 Drawing Sheets

Figure 1:
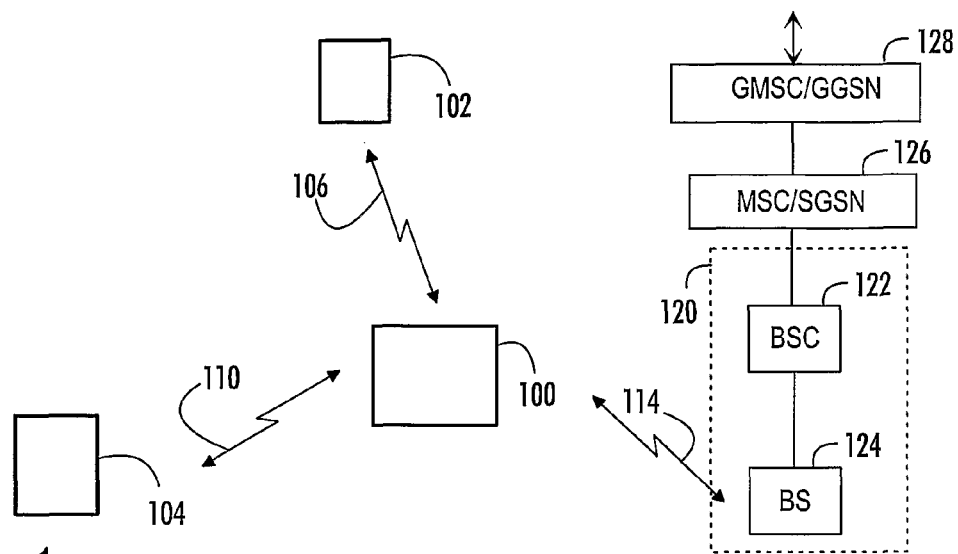

| 402 MONDAY (CLIENT) | |
|---|---|
| 8 AM | IN A MEETING — 400B |
| 9 AM | ▓▓▓▓▓▓▓▓ — 402B |
| 10 AM | AVAILABLE — 404B |
| 11 AM | BUSY — 406B |
| 12 PM | ▓▓▓▓▓▓▓▓ — 408B |
| 1 PM | ▓▓▓▓▓▓▓▓ — 410B |
| 2 PM | AVAILABLE — 412B |
| 3 PM | IN A MEETING — 414B |
| 4 PM | ▓▓▓▓▓▓▓▓ — 416B |

U.S. PATENT DOCUMENTS

| | | | | |
|---|---|---|---|---|
| 6,262,725 | B1* | 7/2001 | Hetherington et al. | 715/733 |
| 6,308,201 | B1 | 10/2001 | Pivowar et al. | 709/214 |
| 6,342,901 | B1* | 1/2002 | Adler et al. | 715/700 |
| 6,396,512 | B1 | 5/2002 | Nickerson | 345/751 |
| 6,507,351 | B1* | 1/2003 | Bixler | 715/810 |
| 6,587,127 | B1* | 7/2003 | Leeke et al. | 715/765 |
| 6,785,868 | B1 | 8/2004 | Raff | 715/530 |
| 7,171,448 | B1* | 1/2007 | Danielsen et al. | 709/205 |
| 2001/0028364 | A1 | 10/2001 | Fredell et al. | 345/751 |
| 2002/0030698 | A1* | 3/2002 | Baur et al. | 345/733 |
| 2002/0044149 | A1* | 4/2002 | McCarthy et al. | 345/581 |
| 2002/0063732 | A1* | 5/2002 | Mansikkaniemi et al. | 345/733 |
| 2002/0143872 | A1* | 10/2002 | Weiss et al. | 709/204 |
| 2002/0177109 | A1 | 11/2002 | Robinson et al. | 434/118 |
| 2002/0180776 | A1* | 12/2002 | Fishman | 345/733 |
| 2003/0009536 | A1 | 1/2003 | Henderson et al. | 709/219 |
| 2003/0101190 | A1 | 5/2003 | Horvitz et al. | 707/100 |
| 2004/0107125 | A1* | 6/2004 | Guheen et al. | 705/7 |
| 2004/0196307 | A1* | 10/2004 | Zak et al. | 345/733 |
| 2004/0243422 | A1 | 12/2004 | Weber et al. | 705/1 |
| 2004/0268270 | A1* | 12/2004 | Hill et al. | 715/963 |
| 2006/0129935 | A1* | 6/2006 | Deinlein et al. | 715/733 |

FOREIGN PATENT DOCUMENTS

| | | |
|---|---|---|
| KR | 42780/2000 | 7/2000 |
| KR | 52030/2003 | 6/2003 |

OTHER PUBLICATIONS

Office Action with translation from corresponding application CN 200480038385.5 dated Apr. 14, 2010, 7 pages.

* cited by examiner

| 400 MONDAY (ALL) | | | |
|---|---|---|---|
| 8 AM | MEETING | W | 400A |
| 9 AM | DENTIST | P | 402A |
| 10 AM | FREE | | 404A |
| 11 AM | TRAINING COURSE | W | 406A |
| 12 PM | LUNCH | P | 408A |
| 1 PM | | | 410A |
| 2 PM | FREE | | 412A |
| 3 PM | MEETING WITH MR T | W | 414A |
| 4 PM | TENNIS WITH PAUL | P | 416A |

Fig. 4 A

| 402 MONDAY (CLIENT) | | |
|---|---|---|
| 8 AM | IN A MEETING | 400B |
| 9 AM | ///////// | 402B |
| 10 AM | AVAILABLE | 404B |
| 11 AM | BUSY | 406B |
| 12 PM | ///////// | 408B |
| 1 PM | ///////// | 410B |
| 2 PM | AVAILABLE | 412B |
| 3 PM | IN A MEETING | 414B |
| 4 PM | ///////// | 416B |

Fig. 4 B

| 404 MONDAY (PERSONAL) | | |
|---|---|---|
| 8 AM | ///////// | 400C |
| 9 AM | DENTIST | 402C |
| 10 AM | FREE | 404C |
| 11 AM | ///////// | 406C |
| 12 PM | LUNCH | 408C |
| 1 PM | WORKING | 410C |
| 2 PM | WORKING | 412C |
| 3 PM | ///////// | 414C |
| 4 PM | TENNIS WITH PAUL | 416C |

Fig. 4 C

METHOD FOR SHARING CALENDAR CONTENT IN COMMUNICATIONS SYSTEM, COMMUNICATIONS SYSTEM AND TERMINAL

FIELD

The invention relates to a method for sharing calendar content in a communications system, to a communications system and a terminal.

BACKGROUND

Prior-art terminals, such as mobile stations or media devices, use different electronic calendars. The users add calendar notes to the appropriate locations in the calendars. It is often useful to share the information in the calendar with other people. For instance, when deciding on meeting schedules, travel or vacation times among several persons, it would be beneficial that the information in the personal calendars of the persons were available. By sharing calendar content, it would be easy and fast to find a meeting time, for instance, that is suitable for all parties without time-consuming telephone calls or e-mail messages.

Sharing calendar content with others is, however, often impossible, because calendars usually also contain confidential information that is not meant for others to see. A person does not want to reveal personal appointments during work-related communication or work-related appointments in connection with free time.

BRIEF DESCRIPTION

It is an object of the invention to provide a method for sharing calendar content in a communications system, a communications system and a terminal in such a manner that the problems related to the prior art are reduced.

As one aspect of the invention, a method is presented for sharing calendar content in a communications system comprising a terminal and at least one remote device that communicates with the terminal, and the method generates in the terminal calendar content from one or more calendar notes. The method of the invention comprises associating one or more calendar notes with calendar profiles of the terminal, each calendar profile defining a unique view to the calendar content on the basis of the calendar notes associated with the calendar profile; selecting in the terminal at least one calendar profile for generating calendar content to be shared; generating the calendar content to be shared on the basis of at least one selected calendar profile and the one or more calendar notes associated with it; and sharing the generated calendar content to be shared between the terminal and the remote device.

The invention also relates to a communications system comprising a terminal and at least one remote device communicating with the terminal, and in the communications system, the terminal is configured to generate calendar content from one or more calendar notes. The terminal of the invention is also configured to associate one or more calendar notes with calendar profiles of the terminal, each calendar profile defining a unique view to the calendar content on the basis of the calendar notes associated with the calendar profile; to select in the terminal at least one calendar profile for generating calendar content to be shared; to generate the calendar content to be shared on the basis of at least one selected calendar profile and the one or more calendar notes associated with it; and to share the generated calendar content to be shared between the terminal and the remote device.

As another aspect of the invention, a terminal of a communications system is presented, which terminal is configured to generate calendar content from one or more calendar notes. The terminal of the invention is configured to associate one or more calendar notes with calendar profiles of the terminal, each calendar profile defining a unique view to the calendar content on the basis of the calendar notes associated with the calendar profile; to select in the terminal at least one calendar profile for generating calendar content to be shared; to generate the calendar content to be shared on the basis of at least one selected calendar profile and the one or more calendar notes associated with it; and to share the generated calendar content to be shared between the terminal and the remote device.

The invention also relates to a terminal of a communications system, which terminal comprises means for generating calendar content from one or more calendar notes. The terminal also comprises means for associating one or more calendar notes with calendar profiles of the terminal, each calendar profile defining a unique view to the calendar content on the basis of the calendar notes associated with the calendar profile; means for selecting in the terminal at least one calendar profile for generating calendar content to be shared; means for generating the calendar content to be shared on the basis of at least one selected calendar profile and the one or more calendar notes associated with it; and means for sharing the generated calendar content to be shared between the terminal and the remote device.

The invention provides several advantages. Calendar content can be shared without revealing confidential information to outsiders. By means of the invention, different type of calendar content can easily and reliably be shared.

LIST OF FIGURES

Figure 2:
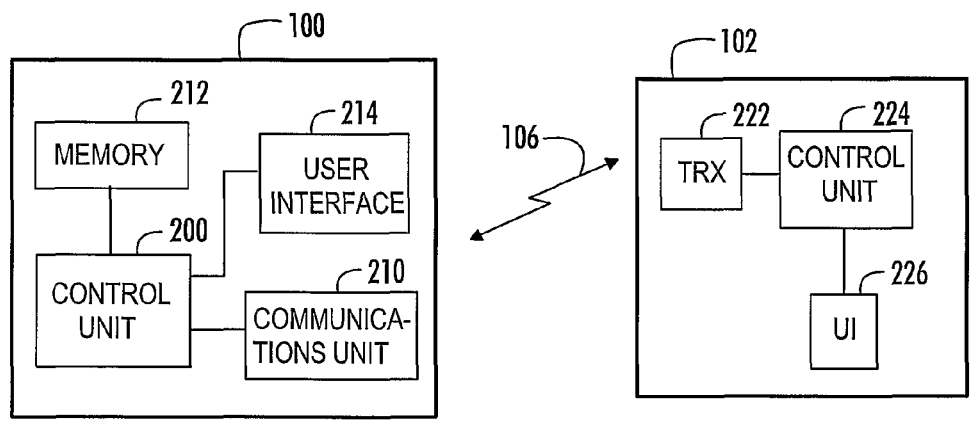
Figure 3:
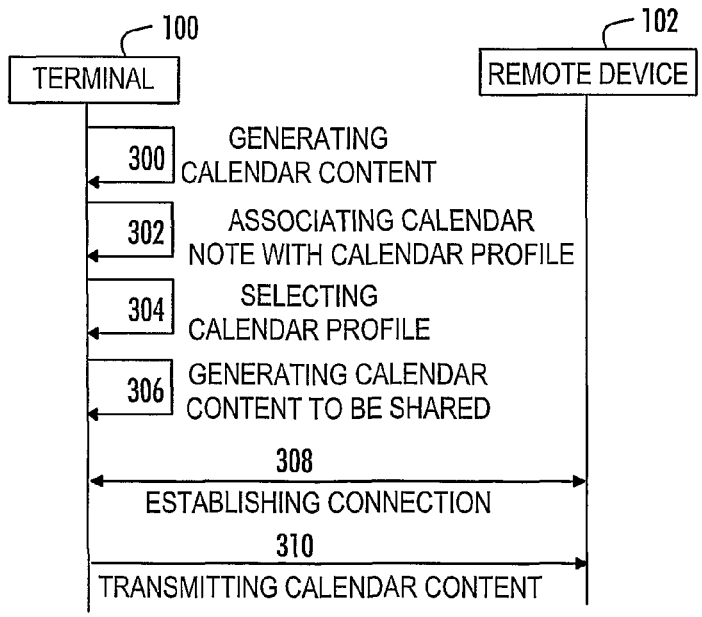

The invention will now be described in greater detail by means of preferred embodiments and with reference to the attached drawings, in which FIG. 1 shows an example of the structure of a communications system, FIG. 2 shows examples of a terminal and remote device of a communications system, FIG. 3 shows an example of a method for sharing calendar content in a communications system, and FIGS. 4A, 4B, and 4C show examples of a method for sharing calendar content in a communications system.

DESCRIPTION OF THE EMBODIMENTS

FIG. 1 shows an example of a communications system to which the presented data transfer solution can be applied. The communications system can be based on GSM (Global System for Mobile Communications), WCDMA (Wideband Code Division Multiple Access), or CDMA (Code Division Multiple Access) technology, for example.

The communications system of FIG. 1 comprises a terminal 100 and one or more remote devices 102, 104. The terminal 100 is for instance a mobile station, media device, or PDA (Personal Digital Assistant) device. The remote device 102, 104 in turn is for instance another mobile station, computer, or PDA (Personal Digital Assistant) device.

The mobile network corresponds for example to a combined structure of the GSM (Global System for Mobile Communications) and GPRS (General Packet Radio Service) systems. GSM network elements manage the establishment of circuit-switched connections and GPRS network elements manage the packet-switched connections. Some of the network elements may, however, be common to both systems.

A centre 126 represents a mobile services switching centre MSC and a serving GPRS support node SGSN that enable circuit- and packet-switched connections in a radio system. The mobile network comprises for instance a gateway 128 that comprises a gateway mobile service switching centre GMSC and a gateway GPRS support node GGSN. GMSC takes care of the circuit-switched connections between the mobile network and external networks, such as the public land mobile network PLMN or public switched telephone network PSTN, and GGSN takes care of the packet-switched connections between the mobile network and external networks, such as the Internet.

The centre 126 controls a radio access network RAN 120 that comprises at least one base station controller BSC 122. The base station controller 122 controls at least one base station 124. The base station controller 122 can also be called a radio network controller, and the base station 124 a B node. The terminal 100 of the communications system can communicate with at least one base station 124 through an air interface.

Remote devices 102, 104 can communicate with the terminal 100 by using fixed cable connections, GSM/GPRS/EDGE connections or for instance short-range wireless connections 106, 110, such as Bluetooth, infrared or WLAN (Wireless Local Area Network) connections. The terminal 100 and the remote devices 102, 104 can also communicate through other systems, such as the Internet, by using fixed, short-range wireless connections or GSM/GPRS/EDGE connections 114, for instance.

It is possible to store in the terminal 100 various setting functions, i.e. user profiles, on the basis of which the terminal 100 works in a certain manner. By changing the user profile, a user can affect several settings in the device at one time.

FIG. 2 shows an example of a terminal 100 and a remote device 102 of the presented communications system. In one embodiment, the terminal 100 comprises means for generating calendar content from one or more calendar notes. The terminal 100 also comprises means for associating one or more calendar notes with specific calendar profiles of the terminal 100, each calendar profile defining a unique view to the calendar content on the basis of the calendar notes associated with the calendar profile, and means for selecting in the terminal 100 at least one calendar profile for generating calendar content to be shared, means for generating the calendar content to be shared on the basis of the selected calendar profile and the one or more calendar notes associated with it, and means for sharing the generated calendar content to be shared between the terminal 100 and remote device 102.

Calendar content can be generated for instance by means of a user interface 214 and control unit 200 that controls the functions of the terminal 100. The terminal 100 also comprises a memory 212 and a communications unit 210, for instance. By means of the user interface 214, the user of the terminal 100 can use the device. The user interface 214 can comprise for instance a display and keyboard or a touch screen. The user interface 214 can comprise, depending on the terminal 100, several different user interface parts. The communications unit 210 can contain a transceiver and antenna, by means of which the terminal 100 can receive and transmit signals. The terminal 100 can contain several other different elements depending on the application of the terminal. The terminal 100 is configured to communicate with the remote device 102 over a communications connection 106 that can be a nonswitched connection, a short-range wireless connection or a GSM/GPRS/EDGE connection. The remote device 102 comprises the following elements, for instance: a transceiver 222 for communicating with the terminal 100, a control unit 224 controlling the functions of the remote device 102, and a user interface part 226.

The control units 200, 224 of the terminal 100 and remote device 102 refer to blocks controlling the operation of the devices that are today usually implemented by a processor and its software, but various hardware solutions are also possible, such as a circuit built from separate logic components or one or more application-specific integrated circuits ASIC. A hybrid of these different implementations is also possible. The functionality described by the actions can thus be implemented with the control units 200, 204.

In one embodiment, the terminal 100 is configured to generate calendar content from one or more calendar notes. The calendar notes can be one or more words, letters, images, or drawings that are generally used to describe the personal daily, weekly, monthly or annual schedule of the user. Some of the calendar notes relate to work and some to personal or free-time events.

In one embodiment, the terminal 100 is configured to associate one or more calendar notes with specific calendar profiles of the terminal. Each calendar profile defines calendar content that differs from the other calendar profiles on the basis of the calendar notes associated with it. It is possible that some of the calendar notes are associated with a calendar profile related to work and some of the calendar notes are associated with a free-time calendar profile. Some of the calendar notes can also be associated with several different calendar profiles. The terminal 100 is configured to associate the calendar notes with specific calendar profiles for instance by detecting identifiers related to the calendar profiles from the calendar notes. The identifiers related to the calendar profiles can be certain words, letters, or images, for instance. It is possible that the identifiers related to the calendar profiles are included in the calendar notes in such a manner that they are detectable from the calendar notes.

To share calendar content between the terminal 100 and remote device 102, for instance, the terminal 100 is configured to detect the calendar profile of the calendar content to be shared. It may be that the user selects the desired calendar profile always when s/he wants to share calendar content with other devices and the terminal 100 registers the selection. It is also possible that the terminal 100 selects as the calendar profile of the calendar content to be shared a specific calendar profile on the basis of the remote device 102 with which the calendar content is to be shared.

The terminal 100 is configured to generate the calendar content to be shared on the basis of the selected one or more calendar profiles and the one or more calendar notes associated with them and to share the generated calendar content to be shared between the terminal 100 and remote device 102. In one embodiment, the calendar content is shared in such a manner that the terminal 100 transmits the calendar content to the remote device 102. It is also possible that the remote device 102 has for instance a limited access right to the terminal 100 and to a specific calendar content, or that the remote device 102 is configured to load the calendar content to the remote device 102. The user profile or the selected calendar profile of the terminal can for instance define how the calendar notes of the calendar content to be shared are displayed in the remote device 102. If the calendar profile of the calendar content to be shared is work-related, the calendar notes related to free time are not as such included in the calendar content that is transmitted to the remote device 102. Work-related calendar notes can be included as such in the calendar content to be shared and the calendar notes related to free time can be in such a format that it is not possible to determine anything of the content of the original calendar note. When the user of the remote device 102 views the shared calendar content received from the terminal 100 by means of the user interface 226 of the remote device 102, for instance, s/he receives the calendar content generated on the basis of a specific calendar profile.

FIG. 3 shows an example of a method for transmitting data in a communications system. In FIG. 3, the first vertical line depicts communication transmitted from the terminal 100 and terminating in it and action performed in the terminal 100. The second vertical line depicts the communication of the remote device 102.

In step 300, the method generates the calendar content. The user of the terminal enters calendar notes through the user interface to the desired locations and defines by means of the user interface the calendar profile they belong to. The terminal generates the calendar content on the basis of these calendar notes. In step 302, one or more calendar notes are associated with the calendar profiles of the terminal. The terminal can, for instance, suggest that calendar notes of a certain type are always associated with certain calendar profiles; for instance a "meeting" calendar note can always be associated with a work-related calendar profile. The calendar notes can also contain identifiers, on the basis of which the terminal can associate them with certain calendar profiles. The user can, for instance, add after each entered calendar note an identifier concerning the calendar profile.

In step 304, at least one calendar profile is selected for the generation of the calendar content to be shared. The calendar content to be shared is the one that the user wants to transmit to the remote device, for instance, or share with a certain user group. The terminal selects the calendar profile of the calendar content to be shared for instance on the basis of who or which remote device will receive it. It is also possible, to detect the calendar profile of the calendar content to be shared in some other manner; the user can, for instance, define the calendar profile with the user interface of the terminal every time s/he transmits calendar content.

In step 306, the calendar content to be shared is generated on the basis of the selected calendar profile and the one or more calendar notes associated with it. It is possible to maintain in the memory of the terminal calendar content sets according to different calendar profiles that are updated every time the calendar notes change, for instance.

In step 308, a connection is established between the terminal and the remote device and in step 310, the calendar content to be shared is transmitted from the terminal to the remote device. The transmitted calendar content can be viewed with the user interface of the remote device, for instance.

FIGS. 4A, 4B, and 4C show examples of a method for sharing calendar content in a communications system. The figures show examples of the calendar contents and their calendar notes generated on the basis of different calendar profiles.

FIG. 4A shows calendar content 400 generated in the terminal and the calendar notes 400A, 402A, 404A, 406, 408A, 410A, 412A, 414A and 416A in it. The calendar content 400 comprises both work-related and personal calendar notes 400A to 416A. The calendar notes 400A, 406A and 414A are work-related. The calendar notes 402A, 408A and 416A, for instance, are free-time-related notes. Some of the calendar notes 404A, 410A, 412A do not seem to directly relate to either work or free time.

Certain calendar notes can be associated with desired calendar profiles. The terminal can be configured to identify certain words, letters or identifiers in the calendar notes, on the basis of which the calendar notes in question can be associated with specific calendar profiles. For instance, in the calendar note 400A "MEETING W", the letter "W" can be an identifier from which the terminal detects that the calendar note 400A is work-related and, therefore, associates the calendar note 400A with a work-related calendar profile. In the calendar note 402A "DENTIST P", the letter "P" can be a corresponding identifier, from which the terminal detects that the calendar note 402A is one to be associated with a free-time-related calendar profile. It is also possible that the terminal is configured to identify certain words, such as "MEETING" in the calendar notes 400A and 414A, on the basis of which the calendar notes are associated with a work-related calendar profile. All calendar notes 400A to 416A do not necessarily need to be associated with a specific calendar profile.

FIG. 4B shows calendar content 402 and the time-bound calendar notes 400B, 402B, 404B, 406B, 408B, 410B, 412B, 414B and 416B in it. The calendar content 402 is in this example generated on the basis of a work-related calendar profile. The calendar content 402 is for instance transmitted from the terminal to a remote device of the user's workmate.

A work-related calendar profile specifies for instance that the calendar notes associated with it are incorporated with a certain, but not necessarily the same, content in the calendar content 402 to be transmitted to a remote device. Thus, for instance, the calendar note 400A "MEETING W" in FIG. 4A corresponds to the calendar note 400B "IN A MEETING" in the calendar content 402. A work-related calendar profile does not contain any calendar notes associated with a free-time-related calendar profile in a format that may reveal any personal information to the recipient. Thus, for instance, the calendar note 402A "DENTIST P" in FIG. 4A that is associated with a free-time-related calendar profile is replaced by a hatched area in the calendar note 402B in the calendar content 402.

The calendar notes, such as the calendar note 410A, that are not actually associated with any specific calendar profile in the calendar content 400 can in a work-related calendar profile be included in the calendar content 402 as a dashed area, for instance, in the calendar note 410B. It is also possible to use colour bars, patterns, or words instead of the dashed area. In a work-related calendar profile, it is possible that some words of the calendar content 400 to be shared as the calendar content 402 are not shown as such, even though the calendar note was associated with a work-related calendar profile. For instance, the calendar note 406A "TRAINING COURSE" corresponds to the calendar note 406B "BUSY" in the calendar content 402. The user does not necessarily want to reveal even all work-related details to his/her workmates. Thus, for instance, the calendar note 414A "MEETING WITH MR T" of the calendar content 400 corresponds to the calendar note 414B "IN A MEETING", whereby certain details related to the meeting are not shared with the recipient. For the user of the remote device, it is often enough to know whether the user of the terminal is free or busy at certain times. Therefore, all calendar notes, even if they are work-related, need not be included in the shared calendar content according to the work-related calendar profile.

FIG. 4C also shows the calendar content 404 and its calendar notes 400C, 402C, 404C, 406C, 408C, 410C, 412C, 414C and 416C. In this example, the calendar content 404 is generated on the basis of a free-time-related calendar profile. The calendar content 404 is for instance transmitted from the terminal to a remote device of a member of the user's family.

The free-time-related calendar profile defines the calendar content 404 such that it does not contain any calendar notes 400B to 416B associated with a work-related calendar profile at least in a form that might reveal confidential work-related information to the recipient. Thus, for instance, the calendar note 400A "MEETING" of FIG. 4A, which is associated with a work-related calendar profile, is in the calendar note 400C of the calendar content 404 replaced by a dark bar. However, the calendar notes associated with a free-time-related calendar profile, such as the calendar notes 402A, 408A and 416A, are also included in the calendar content 404 as the calendar notes 402C, 408C and 416C.

It is also possible that the calendar profile defines the calendar content on the basis of the time of day. For instance, the calendar note 404A "FREE" in FIG. 4A corresponds to the calendar note 404C "FREE" in FIG. 4C, but the similar calendar note 412A "FREE" in FIG. 4A corresponds to the calendar note 412C "WORKING" in FIG. 4C.

Even though the invention has been explained in the above with reference to an example in accordance with the accompanying drawings, it is apparent that the invention is not restricted to it but can be modified in many ways within the scope of the inventive idea disclosed in the attached claims.

The invention claimed is:

1. A method comprising:
    facilitating user entry of one or more calendar entries into a terminal, wherein the entries each include a time of an event and a user-composed calendar note describing the event;
    detecting a text pattern in the one or more calendar notes;
    associating the one or more calendar notes with one or more calendar profiles in a terminal on the basis of the detected text patterns, each calendar profile defining a unique view to the calendar entries;
    selecting in the terminal at least one calendar profile for generating calendar content to be shared;
    generating the calendar content to be shared on the basis of at least one selected calendar profile; and
    establishing a connection between the terminal and at least one user terminal for transmitting or loading the calendar content to be shared to the at least one user terminal;
    wherein generating the calendar content to be shared on the basis of at least one selected calendar profile comprises modifying the calendar notes associated with the shared calendar content, and
    wherein modifying the calendar notes associated with the shared calendar content comprises obscuring the calendar notes associated with the shared content while retaining indicators of the times of the events associated with the obscured calendar notes.

2. The method as claimed in claim 1, further comprising generating the calendar content to be shared as defined by the selected user profile based on a remote device, user group, purpose of use or time of day.

3. A communications system comprising at least two user terminals, wherein a first terminal is configured:
    to facilitating user entry of one or more calendar entries into a terminal, wherein the entries each include a time of an event and a user-composed calendar note describing the event;
    to detect a text pattern in the one or more calendar notes;
    to associate the one or more calendar notes with the one or more calendar profiles in the terminal on the basis of the detected text patterns, each calendar profile defining a unique view to the calendar entries;
    to select in the terminal at least one calendar profile for generating calendar content to be shared;
    to generate the calendar content to be shared on the basis of at least one selected calendar profile; and
    to establish a connection between the terminal and the second user terminal to transmit or load the calendar content to be shared to the second user terminal;
    wherein generating the calendar content to be shared on the basis of at least one selected calendar profile comprises modifying the calendar notes associated with the shared calendar content; and
    wherein modifying the calendar notes associated with the shared calendar content comprises obscuring the calendar notes associated with the shared content while retaining indicators of the times of the events associated with the obscured calendar notes.

4. The communications system as claimed in claim 3, wherein the communications system is configured to generate the calendar content to be shared as defined by the selected user profile based on a remote device, user group, purpose of use or time of day.

5. The communications system as claimed in claim 3, wherein the second user terminal is a media device, computer, PDA (Personal Digital Assistant) device or mobile station.

6. An apparatus comprising:
    a processor; and
    a memory including computer program code, the memory and the computer program code configured to, with the processor, cause the apparatus at least to:
    facilitating user entry of one or more calendar entries into a terminal, wherein the entries each include a time of an event and a user-composed calendar note describing the event;
    detect a text pattern in the one or more calendar notes;
    associate the one or more calendar notes with the one or more calendar profiles on the basis of the detected text patterns, each calendar profile defining a unique view to the calendar entries;
    select at least one calendar profile for generating calendar content to be shared;
    generate the calendar content to be shared on the basis of at least one selected calendar profile; and
    establish a connection between the apparatus and at least one user terminal to transmit or load the calendar content to be shared to the at least one user terminal;
    wherein generating the calendar content to be shared on the basis of at least one selected calendar profile comprises modifying the calendar notes associated with the shared calendar content; and
    wherein modifying the calendar notes associated with the shared calendar content comprises obscuring the calendar notes associated with the shared content while retaining indicators of the times of the events associated with the obscured calendar notes.

7. The apparatus as claimed in claim 6, wherein the device is a mobile station, PDA (Personal Digital Assistant) device, portable computer or media device.

8. A terminal, wherein the terminal comprises:
    an input mechanism configured for facilitating user entry of one or more calendar entries into a terminal, wherein the entries each include a time of an event and a user-composed calendar note describing the event;
    a detection mechanism configured for detecting a text pattern in the one or more calendar notes;
    a processing mechanism configured for associating the one or more calendar notes with the one or more calendar profiles in the terminal on the basis of the detected text patterns, each calendar profile defining a unique view to the calendar entries;

the input mechanism further configured for selecting in the terminal at least one calendar profile for generating calendar content to be shared;

the processing mechanism further configured for generating the calendar content to be shared on the basis of at least one selected calendar profile; and a connection mechanism configured for establishing a connection between the terminal and at least one user terminal for transmitting or loading the calendar content to be shared to the at least one user terminal;

wherein generating the calendar content to be shared on the basis of at least one selected calendar profile comprises modifying the calendar notes associated with the shared calendar content; and wherein modifying the calendar notes associated with the shared calendar content comprises obscuring the calendar notes associated with the shared content while retaining indicators of the times of the events associated with the obscured calendar notes.

9. The method of claim 1, wherein the calendar profile comprises a work profile, and wherein modifying the content comprises removing non-work-related personal information from the content.

10. The method of claim 1, wherein modifying the calendar notes associated with the shared calendar content comprises providing a modified note to describe user availability in the context of both the calendar profile and on the basis of times of day associated with the calendar entries.

11. The apparatus of claim 6, wherein the calendar profile comprises a work profile, and wherein modifying the content comprises removing non-work-related personal information from the content.

12. The apparatus of claim 6, wherein modifying the calendar notes associated with the shared calendar content comprises providing a modified note to describe user availability in the context of both the calendar profile and on the basis of times of day associated with the calendar entries.

* * * * *